US012618511B2

(12) United States Patent　(10) Patent No.:　US 12,618,511 B2

Li　(45) Date of Patent:　May 5, 2026

(54) SUPPORT FRAME STRUCTURE WITH LOCKING MECHANISM

(71) Applicant: DIWEI INDUSTRIAL CO., LTD., Taichung City (TW)

(72) Inventor: Chin-Chu Li, Taichung City (TW)

(73) Assignee: DIWEI INDUSTRIAL CO., LTD., Taichung City (TW)

( * ) Notice: Subject to any disclaimer, the term of this patent is extended or adjusted under 35 U.S.C. 154(b) by 0 days.

(21) Appl. No.: 18/807,914

(22) Filed: Aug. 17, 2024

(65) Prior Publication Data

US 2025/0137582 A1　May 1, 2025

(30) Foreign Application Priority Data

Oct. 25, 2023　(TW) .................................. 112140785

(51) Int. Cl.
F16M 11/10　(2006.01)
F16M 11/20　(2006.01)
(Continued)

(52) U.S. Cl.
CPC .......... F16M 13/022 (2013.01); F16M 11/10 (2013.01); F16M 11/2064 (2013.01); F16M 11/24 (2013.01); F16M 2200/021 (2013.01)

(58) Field of Classification Search
CPC .......... F16M 2200/02; F16M 2200/22; F16M 2200/04; F16M 2200/041;
(Continued)

(56) References Cited

U.S. PATENT DOCUMENTS 5,257,767 A * 11/1993 McConnell ........ A47B 21/0314
248/918
5,738,316 A * 4/1998 Sweere .............. F16M 11/2092
248/920
(Continued)

FOREIGN PATENT DOCUMENTS

CN　202647129 U　1/2013
CN　105299413 A　2/2016
TW　　499890 U　8/2002

OTHER PUBLICATIONS

Office Action dated Jun. 12, 2024 of the corresponding Taiwan patent application No. 112140785.

*Primary Examiner* — Alfred J Wujciak
(74) *Attorney, Agent, or Firm* — HDLS IPR SERVICES; Chun-Ming Shih

(57) ABSTRACT

A support frame structure includes a fixed base, a support mechanism and a pedestal, the support mechanism includes a first rotary joint, a second rotary joint and an arm assembly, the first rotary joint is pivoted to the fixed base, the second rotary joint and the first rotary joint are connected to two ends of the arm assembly respectively, the arm assembly includes an upper arm and a lower arm, the support mechanism further includes a pneumatic cylinder and a locking assembly, two ends of the pneumatic cylinder are pivoted to the first rotary joint and the upper arm respectively, two ends of the locking assembly are connected to the second rotary joint and the lower arm respectively; the pedestal is pivoted to the second rotary joint, and the arm assembly is positioned at a predetermined angle by operating the locking assembly.

9 Claims, 6 Drawing Sheets

(51) Int. Cl.
F16M 11/24 (2006.01)
F16M 13/02 (2006.01)
(58) Field of Classification Search
CPC ....... F16M 2200/044; F16M 2200/047; F16M
2200/048; F16M 2200/063
USPC ..... 248/123.11, 123.2, 162.1, 325, 917, 918,
248/919, 920, 921, 922, 923
See application file for complete search history.

(56) References Cited

U.S. PATENT DOCUMENTS

| | | | | |
|---|---|---|---|---|
| 5,743,503 A * | 4/1998 | Voeller | ............... | F16M 11/2014 |
| | | | | 248/920 |
| 5,799,917 A * | 9/1998 | Li | ........................ | F16M 13/022 |
| | | | | 248/921 |
| 6,012,693 A * | 1/2000 | Voeller | ................. | F16M 11/048 |
| | | | | 248/920 |
| 6,076,785 A * | 6/2000 | Oddsen, Jr. | ............ | F16M 13/02 |
| | | | | 248/281.11 |
| 6,592,090 B1 * | 7/2003 | Li | ........................... | F16M 13/00 |
| | | | | 248/921 |
| 8,864,092 B2 * | 10/2014 | Newville | ............... | F16M 13/02 |
| | | | | 361/679.01 |
| 2004/0084587 A1 * | 5/2004 | Oddsen | .................. | F16M 11/10 |
| | | | | 248/284.1 |
| 2008/0223996 A1 * | 9/2008 | Joanisse | ................. | F16M 13/00 |
| | | | | 248/123.11 |
| 2016/0084432 A1 * | 3/2016 | Chuang | ................ | F16M 13/022 |
| | | | | 108/21 |
| 2016/0109056 A1 * | 4/2016 | Chen | ........................ | F16B 7/10 |
| | | | | 248/277.1 |
| 2018/0356024 A1 * | 12/2018 | Luo | ........................ | F16M 13/02 |

* cited by examiner

SUPPORT FRAME STRUCTURE WITH LOCKING MECHANISM

BACKGROUND OF THE DISCLOSURE

Technical Field

The present disclosure relates to a support frame structure, and more particularly relates to a support frame structure with a locking mechanism.

Related Art

Support frame is a frame provided for supporting a display screen, and mainly includes a support arm with a seat at the lower end of the support arm and a fixed clamp connected under the seat, by means of which the support frame is clamped and fixed at an appropriate position. In addition, the upper end of the support arm is provided with a pedestal base for placing the display screen, and the support arm is internally provided with a pneumatic cylinder, the upper end of the pneumatic cylinder is connected to the support arm, the lower end of the pneumatic cylinder is provided with a fixed base having a protruding pivot extending separately from the left and right sides of the fixed base, two slide shafts are fitted into two slide grooves on the left and right sides of the seat respectively, and the fixed base is provided with a screw hole for connecting a position adjusting screw. Therefore, the lower end of the pneumatic cylinder can be used as a fulcrum to support the support arm to adjust the weight of the support frame.

In addition to the function of mounting the display screen, the related art support frame structure also needs to mount a keyboard or other input devices. As the peripherals such as display screens and keyboards continue to be added, the weight the support frame structure can bear is gradually insufficient. Therefore, various undesirable situations such as the aforementioned peripherals moving downward or shifting often occur during use or operation.

In view of this problem, the present discloser has focused on the above drawbacks of the related art to conduct extensive research and experiment to overcome the problem.

SUMMARY OF THE DISCLOSURE

The present disclosure is directed to a support frame structure with a locking mechanism and capable of preventing an arm assembly from shifting to varying degrees due to the weight of the peripherals.

To achieve the aforementioned objective, the present disclosure provides a support frame structure with a locking mechanism, which includes a fixed base, a support mechanism and a pedestal, the support mechanism includes a first rotary joint, a second rotary joint and an arm assembly, the first rotary joint is pivoted to the fixed base, the second rotary joint and the first rotary joint are connected to two ends, of the arm assembly respectively, the arm assembly includes an upper arm and a lower arm, the support mechanism further includes a pneumatic cylinder and a locking assembly, two ends of the pneumatic cylinder are pivoted to the first rotary joint and the upper arm respectively, two ends of the locking assembly are connected to the second rotary joint and the lower arm respectively; the pedestal is pivoted to the second rotary joint; wherein the arm assembly can be positioned at a predetermined angle through the operation of the locking assembly.

The present disclosure has the advantageous effect of stably maintaining the display screen, the keyboard, and other peripherals at an appropriate working height for operation through the configuration of the locking assembly.

DETAILED DESCRIPTION

Figure 1:
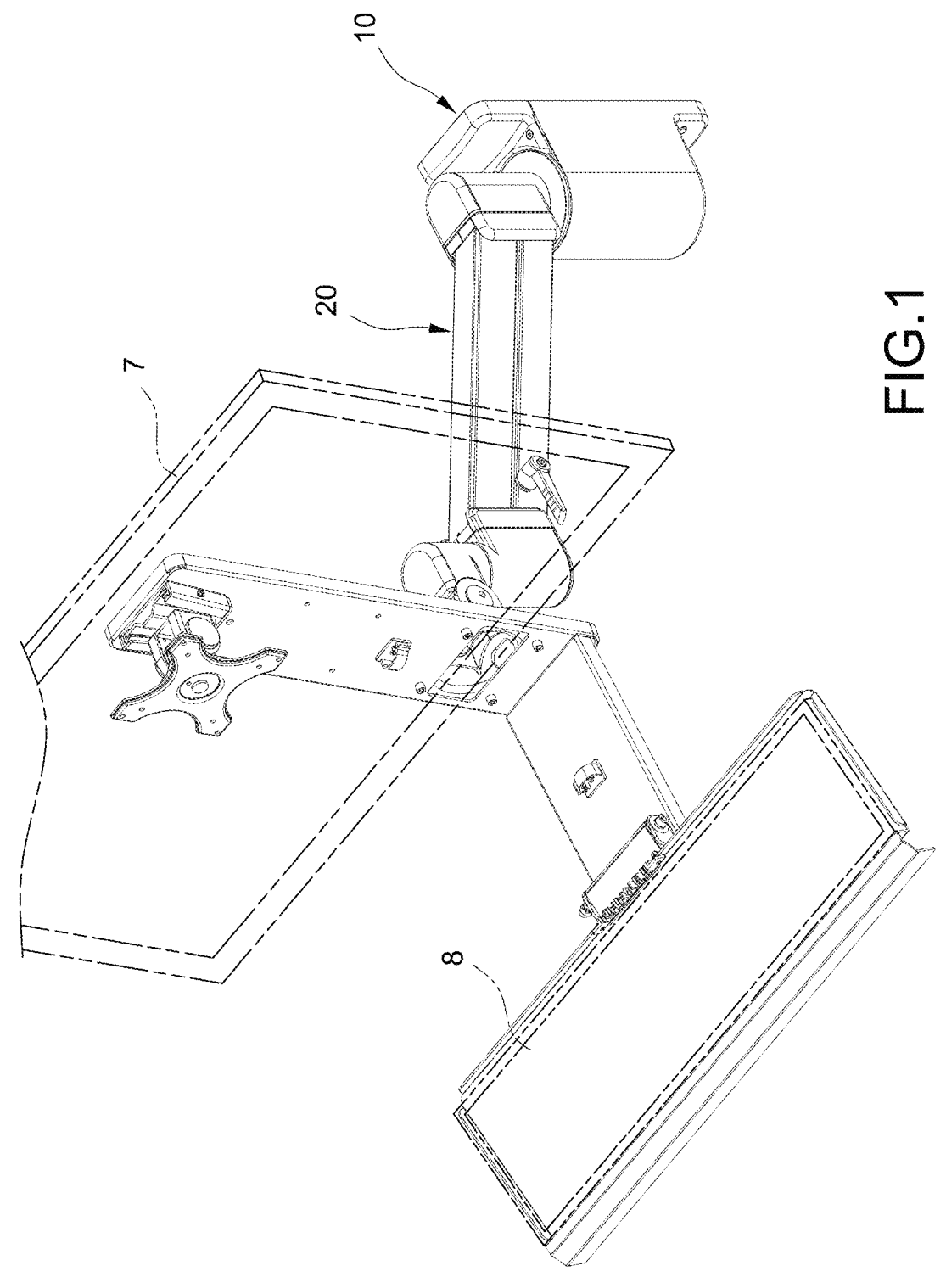
FIG. 1 is a schematic view of a support frame structure with a locking mechanism of the present disclosure applied to the combination of a display device and a keyboard.
Figure 2:
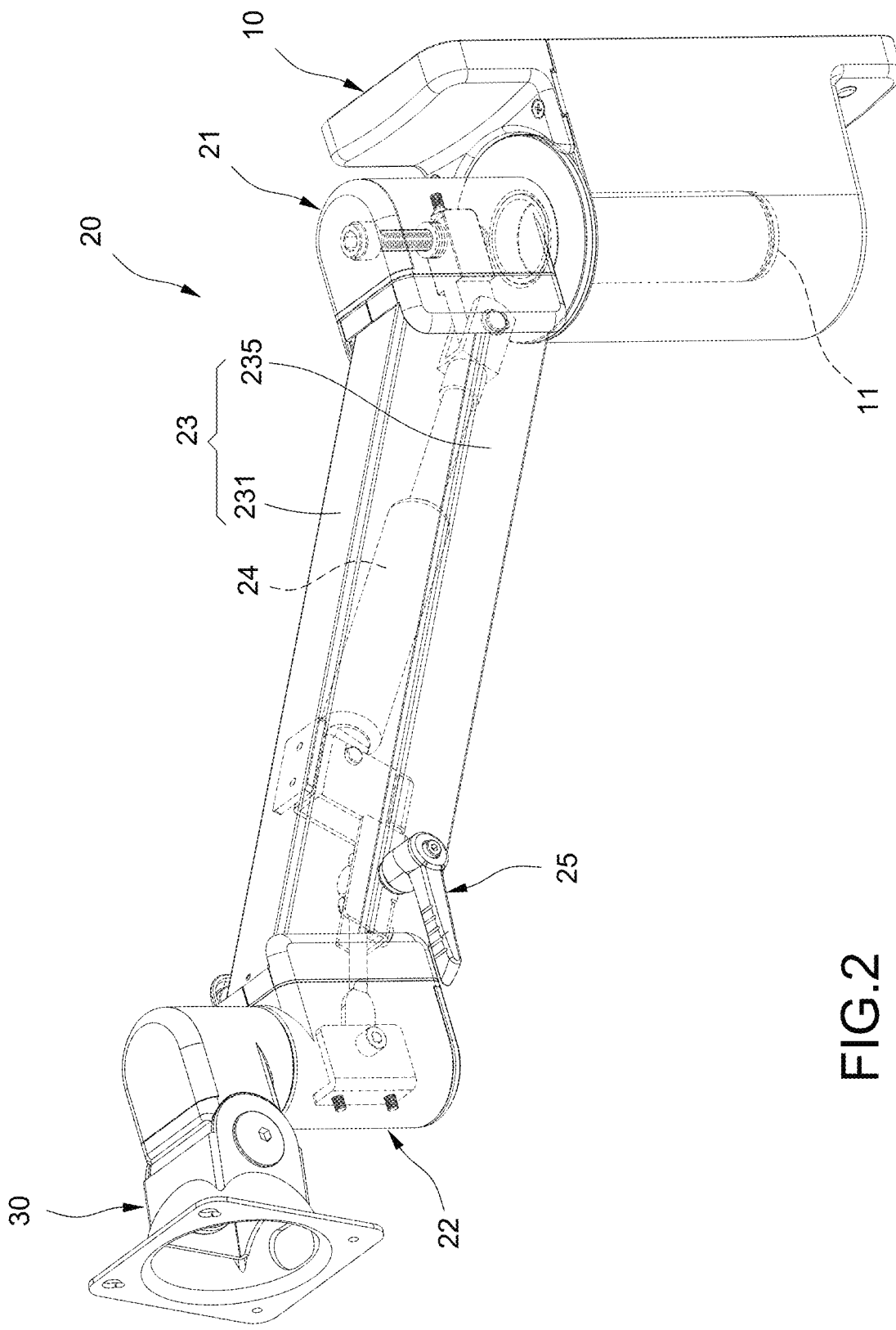
FIG. 2 is a perspective view of a support frame structure with a locking mechanism of the present disclosure.
Figure 3:
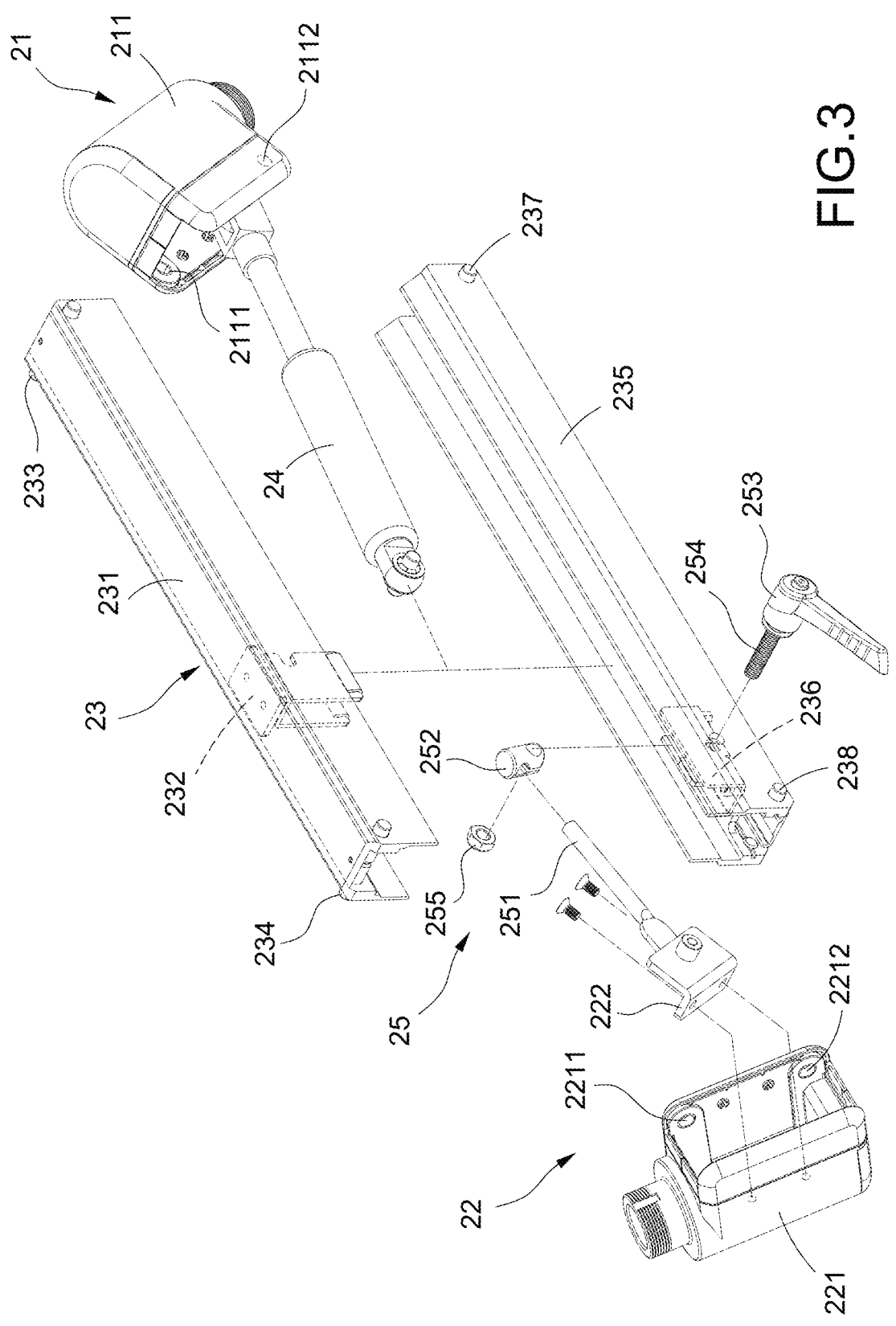
FIG. 3 is an exploded view of a support arm of the present disclosure.
Figure 4:
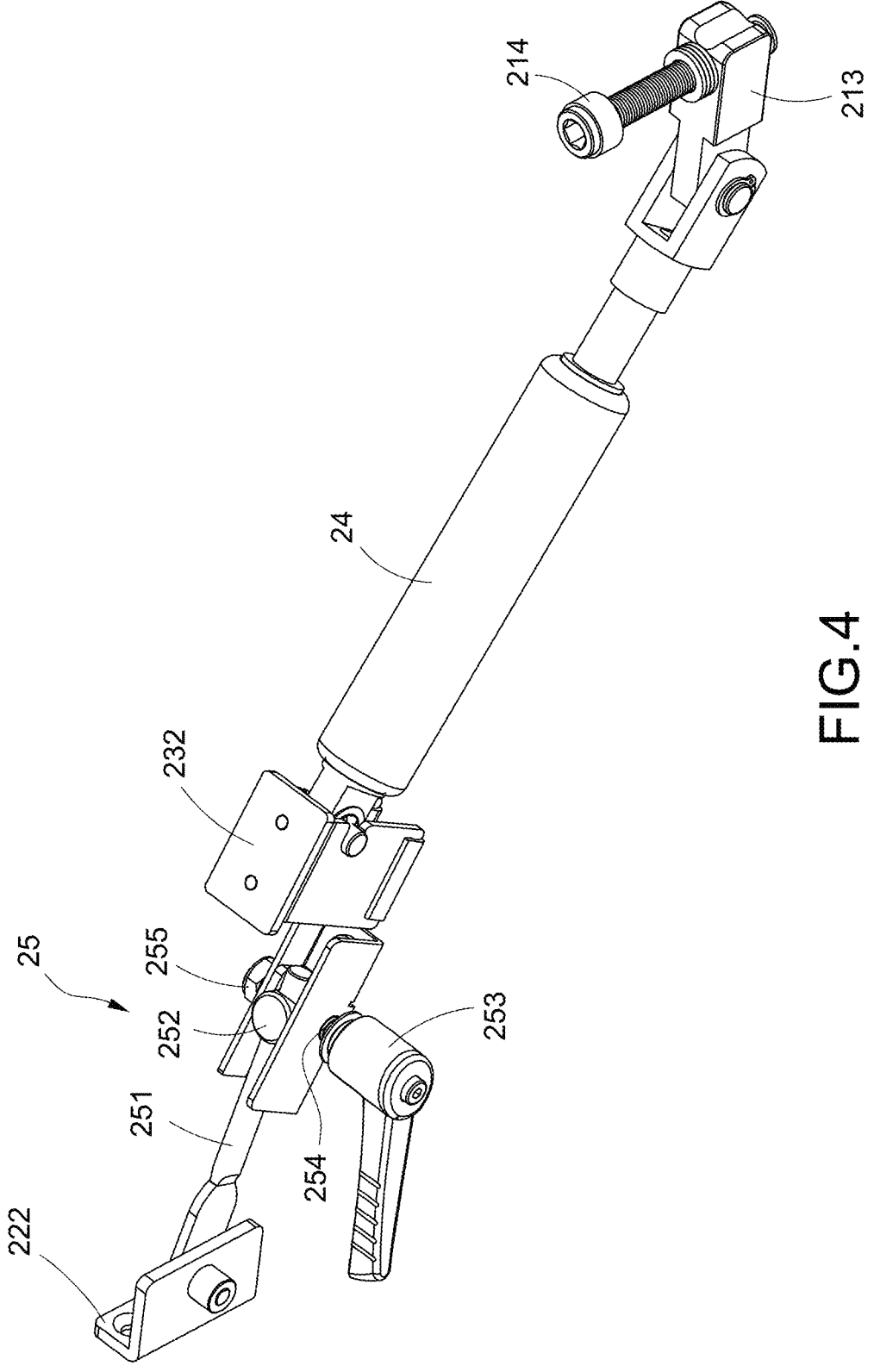
FIG. 4 is a schematic view of a locking assembly and a pneumatic cylinder of the present disclosure.
Figure 5:
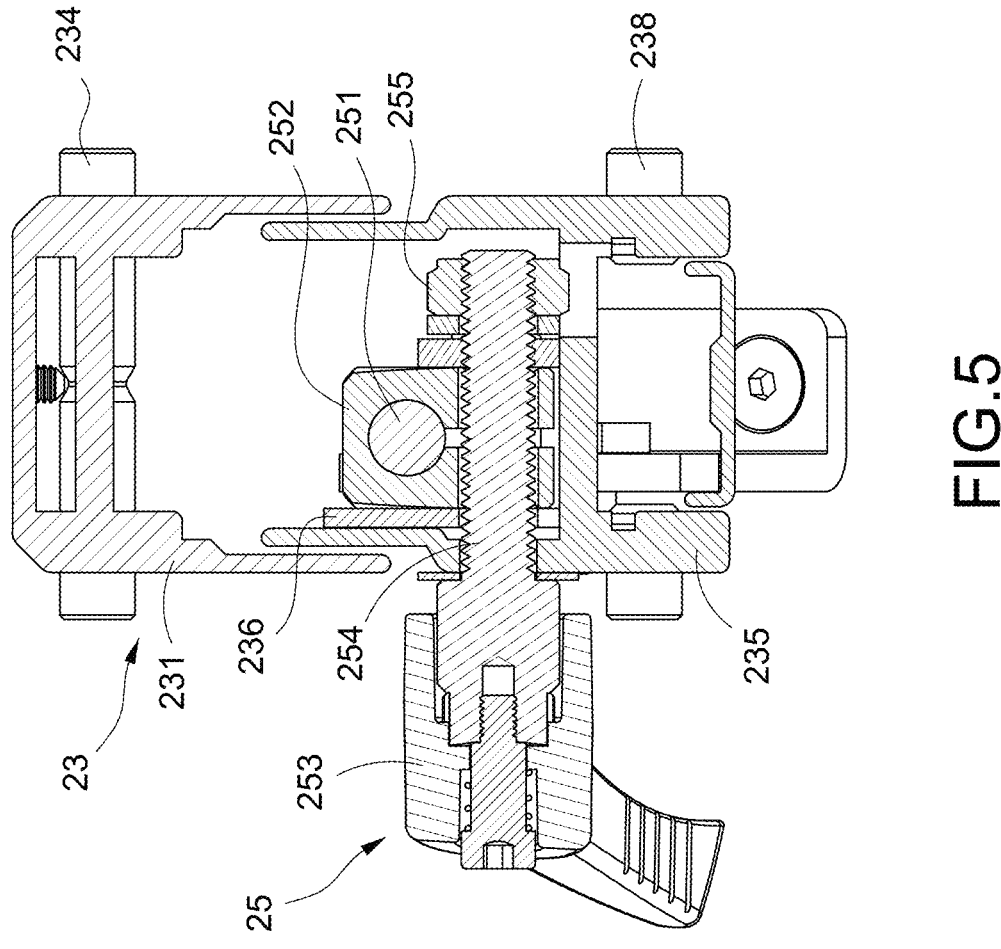
FIG. 5 is a cross-sectional view of a locking assembly of the present disclosure.

The technical characteristics of this disclosure will become apparent with the detailed description accompanied with the illustration of related drawings as follows. It is noteworthy that the embodiments and drawings disclosed herein are to be considered illustrative rather than restrictive.

With reference to FIGS. 1 to 5 for a support frame structure with a locking mechanism of the present disclosure, the support frame structure is provided for mounting peripherals which include but not limited to a display screen 7 and a keyboard 8 in this embodiment, and the support frame structure mainly includes a fixed base 10, a support mechanism 20 and a pedestal 30.

The fixed base 10 is provided to be fixed onto a board or a wall, and it has a receiving hole 11.

The support mechanism 20 mainly includes a first rotary joint 21, a second rotary joint 22 and an arm assembly 23, the first rotary joint 21 is pivoted to the fixed base 10, the second rotary joint 22 and the first rotary joint 21 are connected to two ends of the arm assembly 23 respectively, the arm assembly 23 includes an upper arm 231 and a lower arm 235, the support mechanism 20 further includes a pneumatic cylinder 24 and a locking assembly 25, two ends of the pneumatic cylinder 24 are pivoted to the first rotary joint 21 and the upper arm 231 respectively, and two ends of the locking assembly 25 are connected to the second rotary joint 22 and the lower arm 235 respectively.

Figure 6:
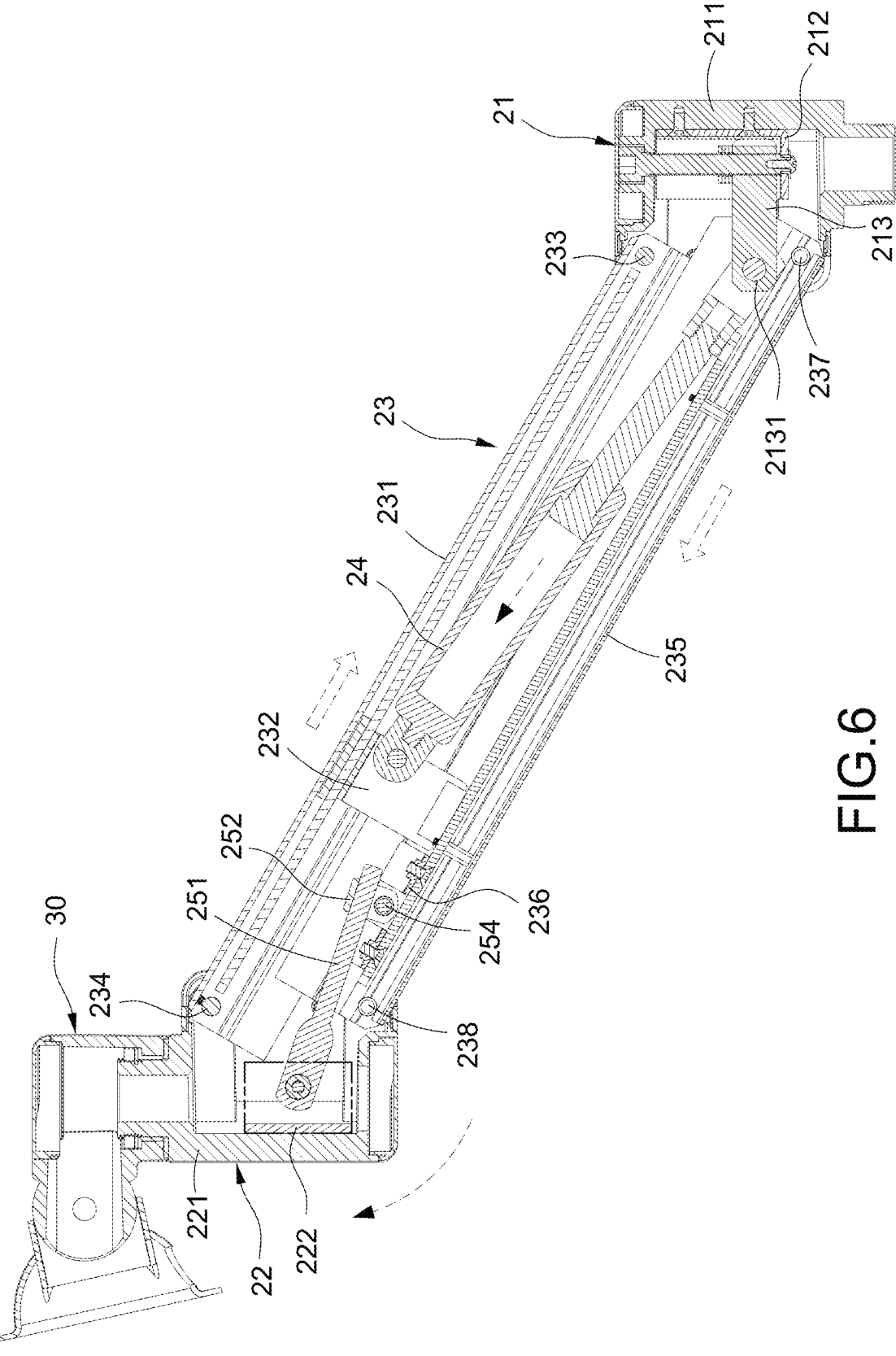
FIG. 6 is a cross-sectional view showing the using status of a support frame structure with a locking mechanism of the present disclosure.

In an embodiment, the first rotary joint 21 mainly includes a first housing 211, a first corner plate 212 (as shown in FIG. 6), a fixed block 213 and a screw 214, where the first housing 211 is rotatably connected to a receiving hole 11 of the fixed base 10 and locked into the first housing 211 by screw elements such as screws, the fixed block 213 fixed on the first corner plate 212 by the screw 214 passing through first corner plate 212 and those are disposed in the first housing 211, an end of the fixed block 213 away from the screw 214 is provided with a pivot hole 2131 (as shown in FIG. 6) for pivoting an end of the pneumatic cylinder 24. In addition, the top of the first housing 211 is provided with a first shaft connection hole 2111, and the bottom of the first housing 211 is provided with a second shaft connection hole 2112.

In an embodiment, the second rotary joint 22 mainly includes a second housing 221 and a second corner plate 222, the second corner plate 222 is locked into the second housing 221 by screw elements such as screws. In addition, the top of the second housing 221 is provided with a third shaft connection hole 2211, and the bottom of the second housing 221 is provided with a fourth shaft connection hole 2212.

In an embodiment, the lower arm 235 is installed to the bottom of the upper arm 231, the interior of the upper arm 231 is provided with a U-shaped frame 232, and another end of the pneumatic cylinder 24 is pivoted to the upper arm 231 through the U-shaped frame 232. In addition, the lower end of the upper arm 231 is provided with a first shaft 233, and the upper end of the upper arm 231 is provided with a second shaft 234, wherein the first shaft 233 passes through the first shaft connection hole 2111 and the upper arm 2310 is pivotally connected to the first housing 211, and the second shaft 234 passes through the third shaft connection hole 2211 and the upper arm is pivotally connected to the second housing 221.

In an embodiment, the interior of the lower arm 235 is provided with a U-shaped base 236, the lower end of the lower arm 235 is provided with a first cam 237, and the upper end of the lower arm 235 is provided with a second cam 238, wherein the first cam 237 passes through the second shaft connection hole 2112 and the lower arm 235 is pivotally connected to the first housing 211, and the second cam 238 passes through the fourth shaft connection hole 2212 and the lower arm 235 is pivotally connected to the second housing 221.

In an embodiment, the locking assembly 25 mainly includes a slider rod 251, a bushing 252, a spanner handle 253, an adjusting screw 254 and a nut 255, the spanner handle 253 is connected to the adjusting screw 254 and formed outside the lower arm 235, the bushing 252 is accommodated in the U-shaped base 236, the adjusting screw 254 passes through the U-shaped base 236 of the lower arm 235 and the bushing 252 and is screwed to the nut 255, one end of the slider rod 251 is connected to the second corner plate 222 of the second rotary joint 22, and the other end of the slider rod 251 is movably inserted to the bushing 252.

The pedestal 30 is pivoted to the second rotary joint 22, and provided for installing and connecting the display screen 7 and the keyboard 8.

In FIG. 6, the spanner handle 253 is rotated and loosened, so that the slider rod 251 is movable in the bushing 252, and the pneumatic cylinder 24 is telescopically movable, and at the same time, the upper arm 231 is slidable relative to the lower arm 235. After the display screen 7 and the keyboard 8 (as shown in FIG. 1) are adjusted to the working height suitable for the operator, the spanner handle 253 is rotated and tightened to press the bushing 252 against the slider rod 251, such that the arm assembly 23 is positioned at a predetermined angle.

While the present disclosure is illustrated by exemplary embodiments, there may be numerous other embodiments of this disclosure, a person skilled in the art may make various corresponding changes and variations in accordance with this disclosure without departing from the spirit of this disclosure, but these corresponding changes and variations shall fall within the scope of protection of the patents applied for in this disclosure.

What is claimed is:

1. A support frame structure with a locking mechanism, the support frame structure comprising:
    a fixed base;
    a support mechanism, comprising a first rotary joint, a second rotary joint and an arm assembly, the first rotary joint connected pivotally to the fixed base, the second rotary joint and the first rotary joint coupled to two ends of the arm assembly respectively, the arm assembly comprising an upper arm and a lower arm, the support mechanism further comprising a pneumatic cylinder and a locking assembly, two ends of the pneumatic cylinder connected pivotally to the first rotary joint and the upper arm respectively, two ends of the locking assembly coupled to the second rotary joint and the lower arm respectively; and
    a pedestal, connected pivotally to the second rotary joint;
    wherein the arm assembly is positioned at a predetermined angle by operating the locking assembly;
    wherein the locking assembly comprising a slider rod and a bushing, one end of the slider rod is coupled to the second rotary joint, and another end of the slider rod is movably inserted to the bushing.

2. The support frame structure according to claim 1, wherein the locking assembly further comprises a spanner handle, an adjusting screw and a nut, the spanner handle is coupled to the adjusting screw, and the adjusting screw passes through the lower arm and the bushing and is screwed with the nut.

3. The support frame structure according to claim 2, wherein the lower arm comprises a U-shaped base disposed therein, the bushing is accommodated in the U-shaped base, and the adjusting screw passes through the U-shaped base.

4. The support frame structure according to claim 3, wherein the spanner handle is disposed outside the lower arm.

5. The support frame structure according to claim 1, wherein the second rotary joint comprises a second housing and a second corner plate, and the second corner plate is fixed in the second housing.

6. A support frame structure with a locking mechanism, the support frame structure comprising:
    a fixed base;
    a support mechanism, comprising a first rotary joint, a second rotary joint and an arm assembly, the first rotary joint connected pivotally to the fixed base, the second rotary joint and the first rotary joint coupled to two ends of the arm assembly respectively, the arm assembly comprising an upper arm and a lower arm, the support mechanism further comprising a pneumatic cylinder and a locking assembly, two ends of the pneumatic cylinder connected pivotally to the first rotary joint and the upper arm respectively, two ends of the locking assembly coupled to the second rotary joint and the lower arm respectively; and
    a pedestal, connected pivotally to the second rotary joint;
    wherein the arm assembly is positioned at a predetermined angle by operating the locking assembly;
    wherein the first rotary joint comprises a first housing, a first corner plate, a fixed block and a screw, the fixed base comprises a receiving hole, the first housing is rotatably coupled to the receiving hole, the first corner plate is fixed inside the first housing, the fixed block is fixed to the first corner plate through the screw passing through the first corner plate, and an end of the fixed block away from the screw is provided with a pivot hole for one end of the pneumatic cylinder to be pivotally coupled.

7. The support frame structure according to claim 6, wherein the upper arm comprises a U-shaped frame installed therein, and another end of the pneumatic cylinder is coupled to the upper arm through the U-shaped frame.

8. A support frame structure with a locking mechanism, the support frame structure comprising:

a fixed base;

a support mechanism, comprising a first rotary joint, a second rotary joint and an arm assembly, the first rotary joint connected pivotally to the fixed base, the second rotary joint and the first rotary joint coupled to two ends of the arm assembly respectively, the arm assembly comprising an upper arm and a lower arm, the support mechanism further comprising a pneumatic cylinder and a locking assembly, two ends of the pneumatic cylinder connected pivotally to the first rotary joint and the upper arm respectively, two ends of the locking assembly coupled to the second rotary joint and the lower arm respectively; and a pedestal, connected pivotally to the second rotary joint;

wherein the arm assembly is positioned at a predetermined angle by operating the locking assembly;

wherein the first rotary joint comprises a first housing with a first shaft connection hole, the second rotary joint comprises a second housing with a third shaft connection hole, the upper arm comprises a first shaft and a second shaft, the first shaft passes through the first shaft connection hole and the upper arm is connected pivotally to the first housing, and the second shaft passes through the third shaft connection hole and the upper arm is connected pivotally to the second housing.

9. The support frame structure according to claim 8, wherein the first housing comprises a second shaft connection hole, the second housing comprises a fourth shaft connection hole, the lower arm comprises a first cam and a second cam, the first cam passes through the second shaft connection hole and the lower arm is connected pivotally to the first housing, and the second cam passes through the fourth shaft connection hole and the lower arm is connected pivotally to the second housing.

* * * * *